United States Patent [19]
Kobayashi

[11] Patent Number: 5,111,361
[45] Date of Patent: May 5, 1992

[54] DEVICE HAVING A SLIDER PORTION AND A STAND PORTION FOR TITLING A COMPACT ELECTRONIC APPARATUS

[75] Inventor: Takaichi Kobayashi, Tokyo, Japan

[73] Assignee: Kabushiki Kaisha Toshiba, Kawasaki, Japan

[21] Appl. No.: 719,983

[22] Filed: Jun. 24, 1991

Related U.S. Application Data

[62] Division of Ser. No. 542,041, Jun. 22, 1990.

[30] Foreign Application Priority Data

| Jun. 23, 1989 | [JP] | Japan | 1-162216 |
| Jun. 23, 1989 | [JP] | Japan | 1-162219 |
| Jun. 23, 1989 | [JP] | Japan | 1-162221 |

[51] Int. Cl.⁵ .................. H05K 5/02; H02B 1/00; F16M 11/00
[52] U.S. Cl. .................. 361/394; 361/380; 248/677; 108/132
[58] Field of Search .......... 248/351, 677; 108/132; 364/708; 361/380, 390, 391, 392, 393, 394, 395, 399

[56] References Cited

U.S. PATENT DOCUMENTS

| 4,568,056 | 2/1986 | Lowinski | 248/677 |
| 4,571,456 | 2/1986 | Paulsen et al. | 364/708 X |
| 4,658,124 | 4/1987 | Bertina | 248/677 X |
| 4,742,478 | 5/1988 | Nigro, Jr. et al. | 364/708 |
| 4,858,162 | 8/1989 | Kieffer et al. | 364/708 |
| 4,951,241 | 8/1990 | Hosoi et al. | 364/708 |
| 4,958,889 | 9/1990 | Boyle et al. | 361/395 X |

OTHER PUBLICATIONS

TOSHIBA T1600 Portable Personal Computer User's Manual (Sep. 1988), pp. i, 2-1 thru 2-7, 4-20 thru 4-25 (Copy in patent 07/542,041).
Published Unexamined Japanese Utility Model Application No. 64-54369 (Japanese language, no translation available) (Copy in patent 07/542,041).

Primary Examiner—Leo P. Picard
Assistant Examiner—Michael W. Phillips
Attorney, Agent, or Firm—Cushman, Darby & Cushman

[57] ABSTRACT

A compact electronic apparatus includes a tilting mechanism for tilting the housing of the apparatus. The mechanism includes a stand connected to a slider through a coupling portion. In tilting the housing, the stand is rocked while being drawn out from the receiving depression, and then the slider is inserted into a slide passage formed in the housing. The coupling portion is inserted into the slide passage along with the slider. The raised stand is locked by the slide passage and prevented from falling in the back and forth directions.

6 Claims, 9 Drawing Sheets

DEVICE HAVING A SLIDER PORTION AND A STAND PORTION FOR TITLING A COMPACT ELECTRONIC APPARATUS

This is a division of application Ser. No. 07/542,041, filed Jun. 22, 1990.

BACKGROUND OF THE INVENTION

1. Field of the Invention

The present invention relates to a compact electronic apparatus, such as a laptop personal computer, word processor, etc.

2. Description of the Related Art

Various portable compact electronic apparatuses in which a keyboard is disposed at the front portion of a housing having a substantially rectangular plane configuration are known in the art. A display unit, containing a flat panel display therein, is rockably mounted between the keyboard and the rear portion of the housing, so that the keyboard is covered by the display unit when it is shut down.

A compact electronic apparatus, such as a laptop personal computer, is provided with a tilting mechanism for tilting the keyboard forward so as to improve the operability of the keyboard.

In a conventional tilting mechanism, a pair of legs are provided at the right and left ends of the bottom of the rear portion of the housing. By raising the legs folded on the bottom of the housing, the housing is declined forward so that the keyboard can be used in a tilting state.

However, with the above tilting mechanism, the two legs must be rocked, thus making the tilting operation troublesome. Further, the housing is declined only by raising the legs, so that the tilting state of the housing is not stable.

SUMMARY OF THE INVENTION

It is an object of the present invention to provide a compact electronic apparatus wherein the housing can be easily and stably tilted.

In order to achieve the object of the present invention, among others, the present invention includes a compact electronic apparatus comprising: a housing substantially in the form of a rectangular prism, having a bottom face constituting a mounting surface and a top face opposed to the bottom face; information input means on the top face of the housing; and tilting means at the rear potion of the housing for tilting the bottom face. The tilting means includes a guide passage formed in the housing, having an opening on the bottom face of the housing, and extending from the opening toward the top face of the housing. A slider, having a first connecting portion, is arranged in the guide passage and movable along the extending direction of the guide passage, between an up position where the first connecting portion is situated inside the guide passage and a down position where the first connecting portion is situated outside the passage. A plate-like stand, having a second connecting portion, is connected to the first connecting portion. The stand is rockable between a raised position where the stand extends along the extending direction of the guide passage and a housed position where the stand extends substantially parallel to the bottom face of the housing when the slider is in the down position. The second connecting portion is adapted to be inserted into the guide passage, thereby keeping the stand in the raised position when the slider is moved to the up position. A receiving depression is formed in the bottom face of the housing and communicates with the opening of the guide passage. The stand is moved to its housed position, it is housed in the receiving depression.

To tilt the housing, the stand is rocked while being drawn out, and then the stand and coupling portion are inserted into the slide passage. The stand is inserted until it is restricted by the stopper means. At that point, the coupling portion is located in the slide passage. Therefore, the raised stand is locked in place by the slide passage and prevented from falling back and forth. When the compact electronic apparatus with its stand in the raised portion is placed on a desk or the like, the keyboard is declined (tilted) forward.

Therefore, the tilting operation can be performed by rocking the single stand. Further, the raised stand is restrained from falling in the longitudinal direction of the housing by the wall defining the slide passage, thus ensuring high stability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

As shown in FIGS. 1 to 4, the personal computer comprises a plastic housing 1 having a substantially rectangular plane configuration. The housing 1 includes a base portion 2, which has a substantially rectangular bottom wall and a peripheral wall protruding therefrom and extending along the peripheral edge of the bottom wall, and a cover portion 3 covering the rear half of the top face of the base portion. A keyboard unit 4 is mounted on the front half of the base portion 2. The top face of the housing 1 has a stepped form, including front and rear half portions 6 and 8. The front half portion 6, which includes the keyboard unit 4, is situated at the front half portion of the housing. The rear half portion 8 is situated at the rear half portion of the housing and on a higher level than the front half portion 6.

The housing 1 contains therein a printed board (not shown) mounted with electronic components, a printed board (not shown) for indicator, a floppy disk drive unit 10, etc.

As shown in FIGS. 1 to 4, a display unit 12 is rockably mounted on the cover portion 3 of the housing 1. The unit 12 includes a flat panel display 14, such as a liquid crystal display, an outer cover 12a enclosing the back of the display 14, and an inner cover 12b having a display window. Further, the unit 12 has a pair of legs 16a and 16b, which are inserted in their corresponding recesses 18 in the upper surface of the cover portion 3, and are rockably supported by means of hinges mentioned later. Thus, the display unit 12 can rock between an open position shown in FIG. 1, where it allows an operator to operate the keyboard 4 while observing the display 14, and a closed position shown in FIG. 2, where it conceals the keyboard 4. The display unit 12 is designed so that the upper surface of the outer cover 12a is continuous and flush with that of the cover portion 3 of the housing 1 or the rear half portion 8 when in the closed position.

The display unit 12 can be kept at the closed position by engaging its elastic hook 20a with a retaining groove 20b in the front end face of the housing 1. Further, the unit 12 can be kept fixed at any desired opening angle by means of hinges (mentioned later) for connection with the cover portion 3. Lead wires for connecting the display unit 12 and the printed boards in the housing 1 are passed through the legs 16a and 16b of the unit 12.

Figure 1:
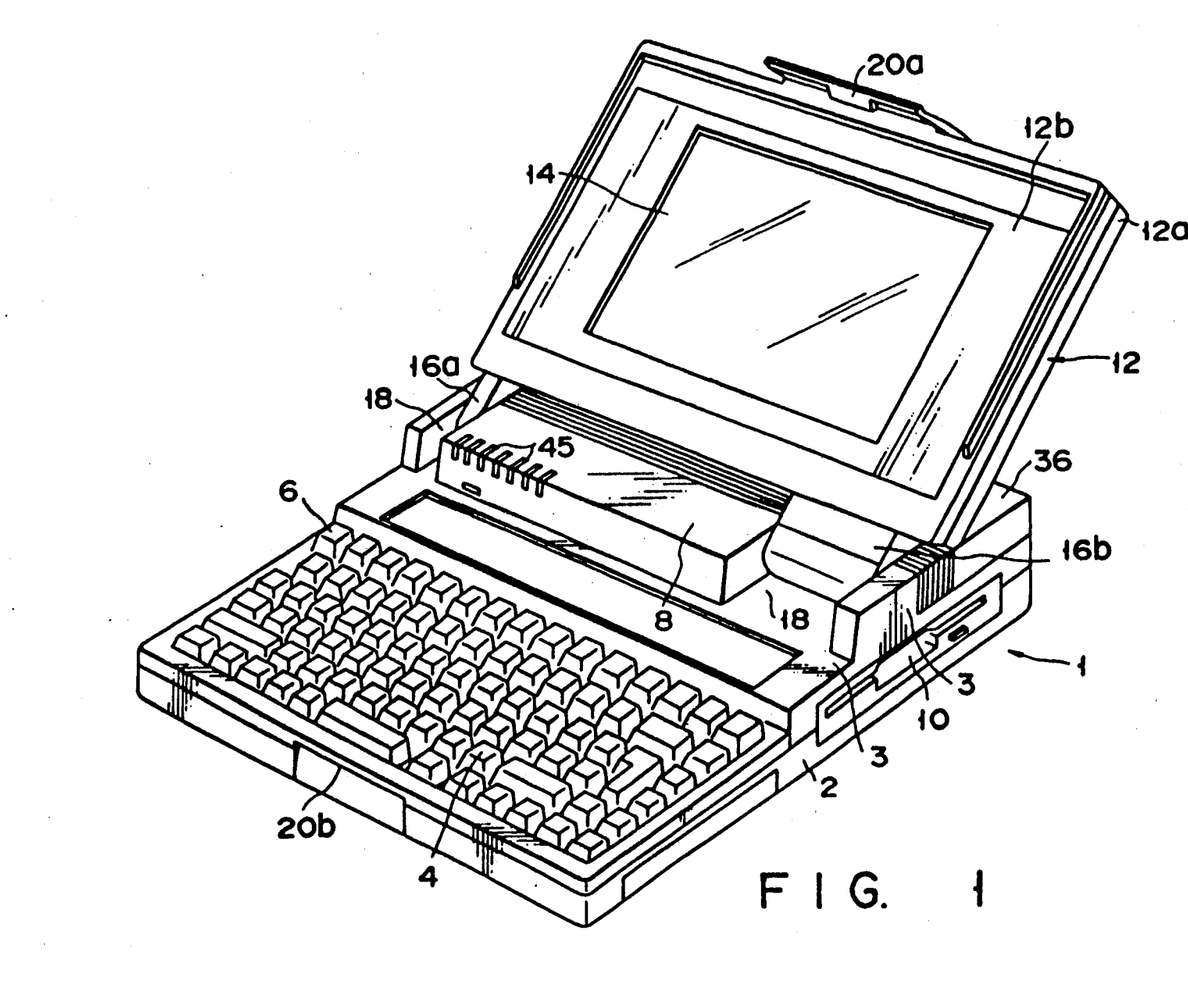
FIG. 1 is a perspective view of the computer with its display unit open.
Figure 2:
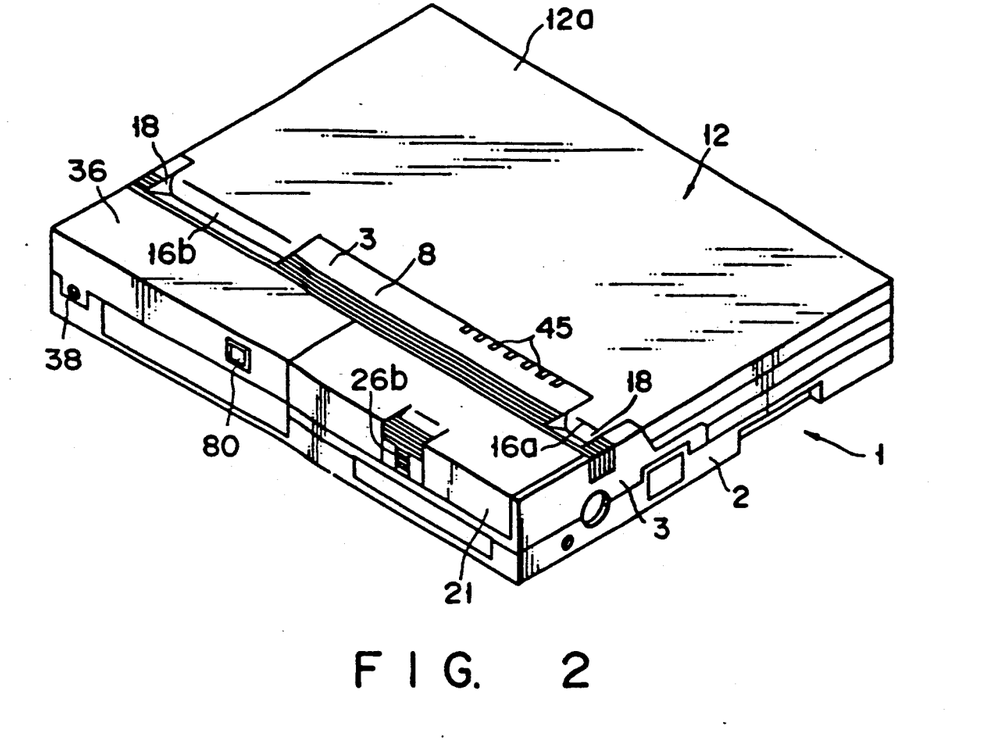
FIG. 2 is a rear perspective view of the computer with the display unit closed.

In FIGS. 1 and 2, the reference numeral 45 denotes an indicator which is viewable without regard to the state, open or closed, of the display unit 12.

Figure 5:
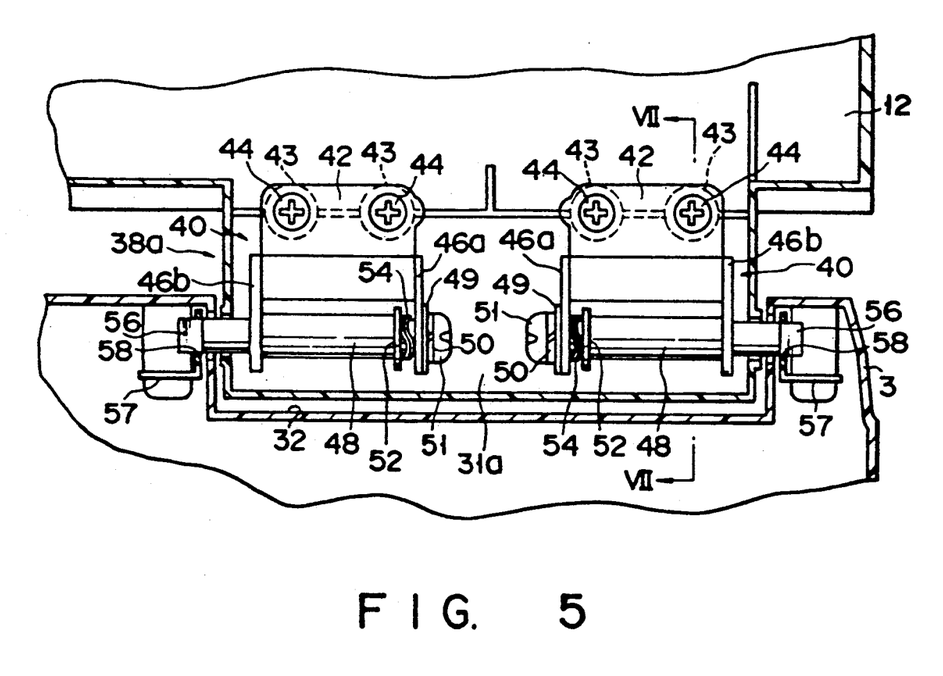
FIG. 5 is a sectional view showing hinges.
Figure 6:
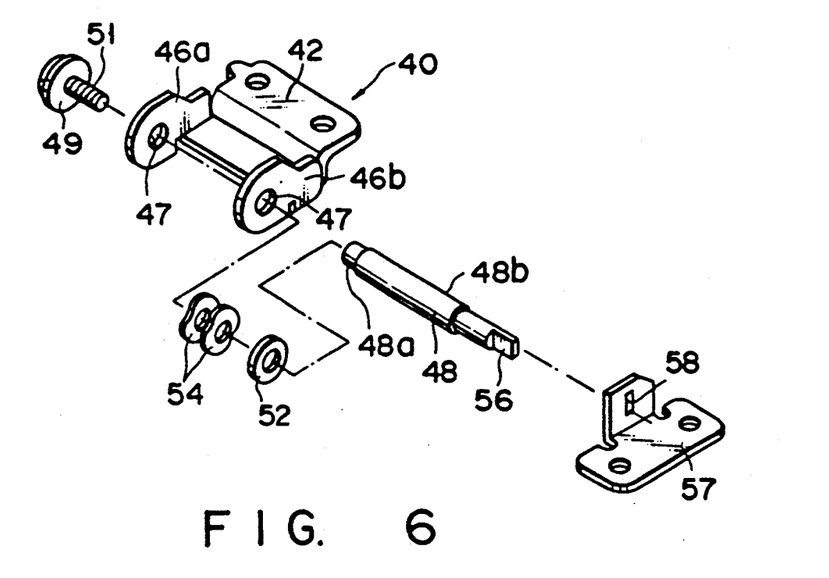
FIG. 6 is an exploded perspective view of one of the hinges.
Figure 7:
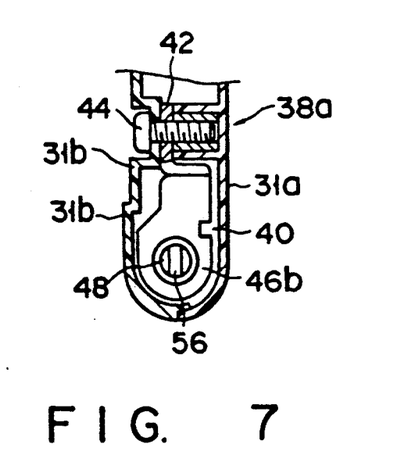
FIG. 7 is a sectional view taken along line VII—VII of FIG. 5.

As shown in FIGS. 5 to 7, a pair of hinges 40 are incorporated in the leg 16b of the display unit 12. These hinges 40 serve not only to support the display unit 12 for rocking motion, but also to keep the unit 12 fixed at any desired opening angle. Since the two hinges 40 have the same construction, only one of them will be described in detail below.

The hinge 40 is provided with a bracket 42, which is fixed to a pair of bosses 43 on the inside of the outer cover 12a by means of screws 44. The bracket 42 has a pair of integral bearing walls 46a and 46b facing each other, and a through hole 47 is bored through each bearing wall. A rotating shaft 48 is rotatably passed through the holes 47. A screw 51 is screwed in one end of the shaft 48 with the aid of a plain washer 49 and a spring washer 50, whereby the shaft 48 is prevented from coming off the bracket 42.

The rotating shaft 48 is a stepped shaft having a small-diameter portion 48a and a large-diameter portion 48b. A plain washer 52 with an outer diameter greater than the large-diameter portion 48b is fitted on the small-diameter portion 48a. A stepped portion between the large- and small-diameter portions 48a and 48b is situated close to the bearing wall 46a, and the washer 52 abuts against this stepped portion. Further, wave washers 54 for use as ring-shaped spring members, e.g., two in number, are mounted on the small-diameter portion 48a so as to be situated between the bearing wall 46a and the plain washer 52. The washers 54 are axially compressed between the wall 46a and the washer 52 by means of the fastening force of the screw 51. Thus, a frictional force is produced between the wall 46a and the washer 52, that is, between the bracket 42 and the rotating shaft 48, by the action of the wave washers 54. This frictional force serves to restrain the relative rotation of the bracket 42 and the shaft 48.

The other end portion of the rotating shaft 48 projects into the inside space of the cover portion 3, penetrating the wall of the leg 38a and a wall defining the recess 18. A rectangular stopper portion 56 is formed at the projecting end portion of the shaft 48. The stopper portion 56 is nonrotatably fitted in a rectangular hole 58 of a receiving fitment 57, which is fixed to the inside of the cover portion 3.

When the display unit 12 is rocked from its closed position to a desired open position, the bracket 42, fixed on the display unit side, rocks around the outer peripheral surface of the rotating shaft 48. The two wave washers 54 are interposed compressed between the washer 52 on the shaft 48 and the bearing wall 46a of the bracket 42. Accordingly, the washers 54 are pressed against both the wall 46a and the washer 52 to produce the frictional force between them. This frictional force restrains the bracket 42 and the rotating shaft 48 from rocking relatively to each other, so that the display unit 12 can be kept fixed at the desired open position.

Figure 8:
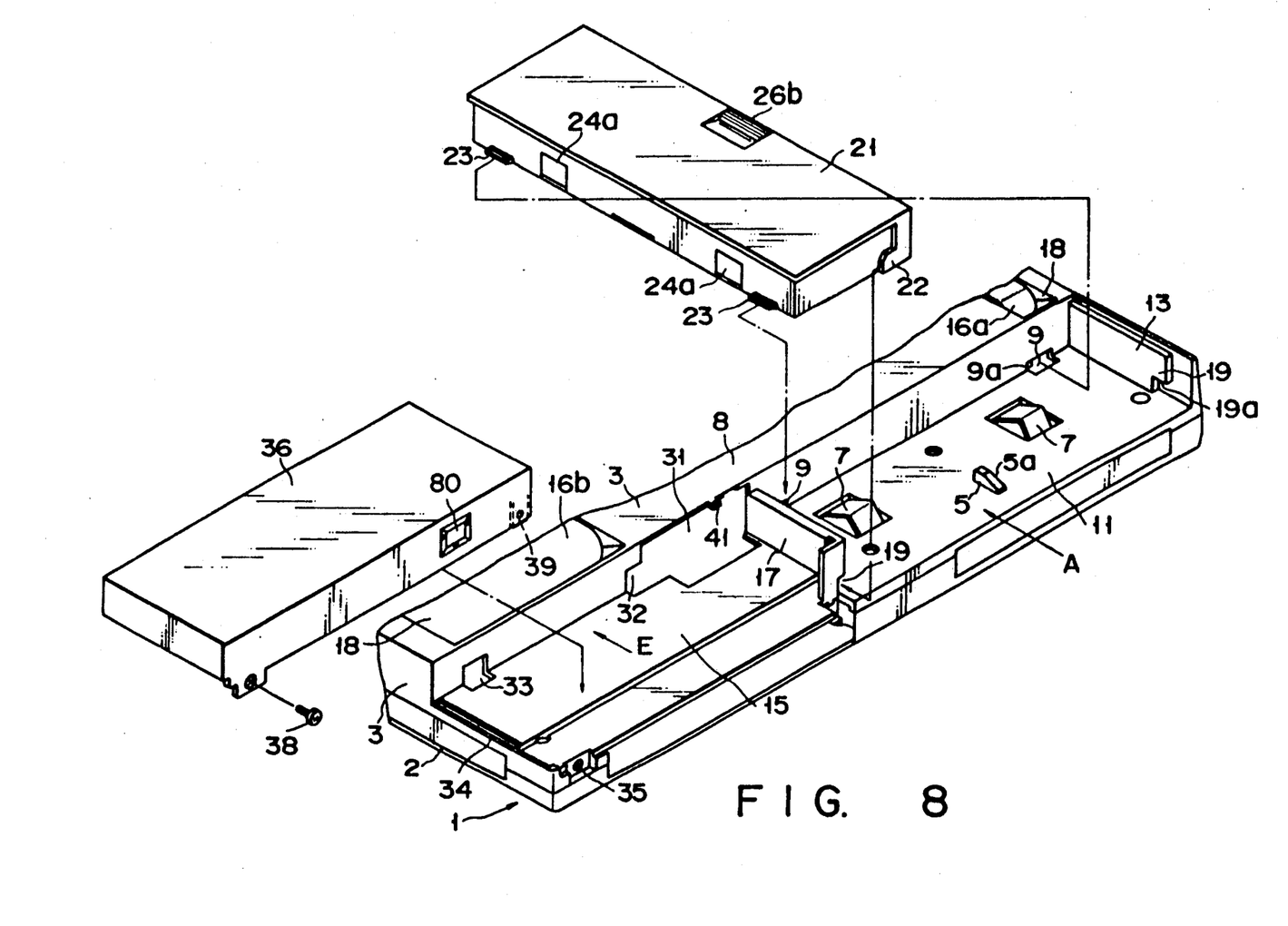
FIG. 8 is an exploded perspective view showing the rear portion of the computer.

As shown in FIG. 8, a substantially rectangular power source receiving recess 11 and an optional part receiving recess 15, both extending long from side to side, are arranged side by side at the back of the recesses 18 of the rear portion or cover portion 3 of the housing 1. The recesses 11 and 15 open to the top face of the rear portion of the housing 1, i.e., the rear half portion 8, and the rear face of the housing. Further, the optional part receiving recess 15 opens to the lateral face of the rear portion of the housing 1, on the opposite side thereof to the power source receiving recess 11.

As shown in FIG. 8, the housing 1 has a pair of parallel wall portions 13 and 17 formed at the rear portion thereof, and the power source receiving recess 11 is defined between these wall portions. The wall portion 17 is situated between the recesses 11 and 15, thereby separating the two. A peripheral retaining portion or projection 19 is formed at the rear end portion of each of the wall portions 13 and 17. The respective retaining portions 19 of the wall portions 13 and 17 face each other. Each retaining portion 19 has a retaining surface 19a at a predetermined distance from the upper surface of the bottom wall of the power source receiving recess 11. Also, a pair of peripheral retaining portions 9 are formed at the corner between a front end wall and the bottom wall defining the recess 11. Each retaining portion 9, which is formed of a through hole, has a retaining surface 9a (upper side edge) spaced from the upper surface of the bottom wall of the recess 11.

A pair of terminal fitments 7 project into the power source receiving recess 11 through the bottom wall thereof. A detent projection 5 protrudes integrally from the upper surface of the bottom wall of the recess 11 so as to be situated between the fitments 7. The projection 5 has a slanting surface 5a which ascends forward from the rear end of the housing 1. The terminal fitments 7, which can be elastically deformed, is connected electrically with a battery pack 21 described below.

Figure 3:
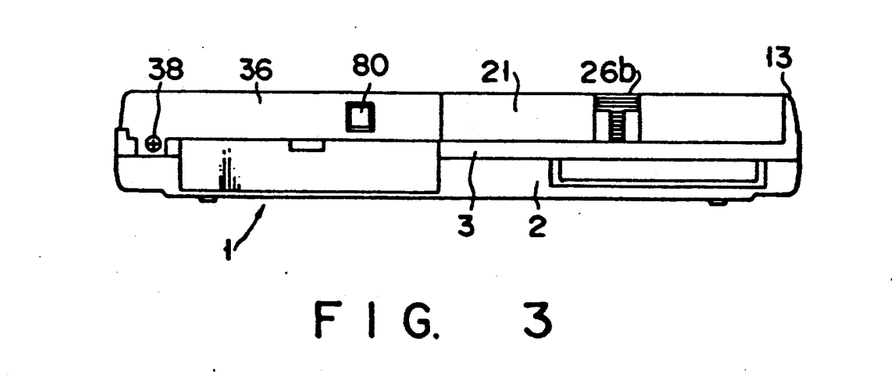
FIG. 3 is a rear view of the computer.

The battery pack 21, which is of a charging type, serves as a power source for the personal computer. The pack 21 is fitted in the power source receiving recess 11 so that it can be removed from the back thereof. In the fitted state, the top and rear faces of the battery pack 21 are exposed, as shown in FIGS. 2 and 3, thus constituting part of an outer rear face of the housing 1. The top and rear faces of the battery pack 21, in particular, are situated flush with the rear half portion 8 of the top face of the housing 1 and the rear face thereof, respectively. The top face of the pack 21 is also flush with the top face of the display unit 12 in the closed state.

Figure 9:
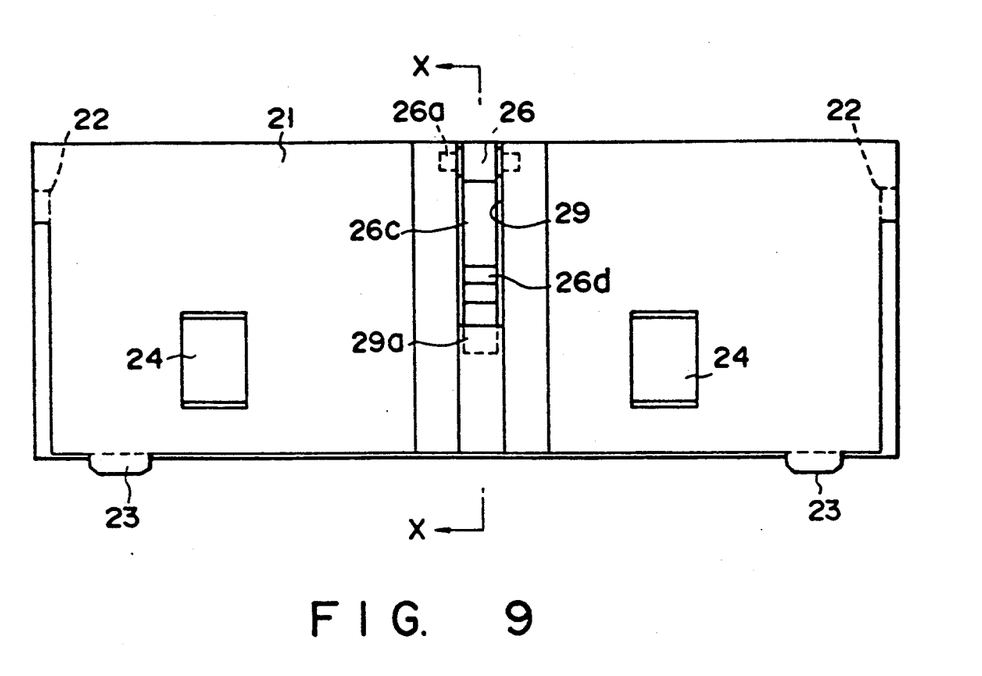
FIG. 9 is a bottom view of a battery pack.

The battery pack 21 has the form of a rectangular prism, as shown in FIGS. 8 and 9. A retaining projection 22 is formed integrally on each lateral face of the pack 21 so that it can releasably engage its corresponding peripheral retaining portion 19. Also, a pair of retaining projections 23 protrude integrally from the front face of the battery pack 21 so that they can releasably engage their corresponding retaining portions 9. Furthermore, a pair of terminal strips 24, which are in contact with the terminal fitments 7, are exposed from the lower surface of the battery pack 21.

When the battery pack 21 is inserted into the power source receiving recess 11 from the back of the housing 1, in the direction of arrow A of FIG. 8, the retaining projections 23 are caused to engage their corresponding retaining portions 9, while the retaining projections 22 are caused to engage their corresponding retaining portions 19. As a result, the terminal fitments 7 come elastically into contact with their corresponding terminal strips 24 of the battery pack 21, thereby urging the pack 21 upward. Thus, the battery pack 21 is mounted in the power source receiving recess 11 in a manner such that it is restrained from moving from side to side by the wall portions 13 and 17, and from moving upward by the aforesaid engaging structures.

Figure 10:
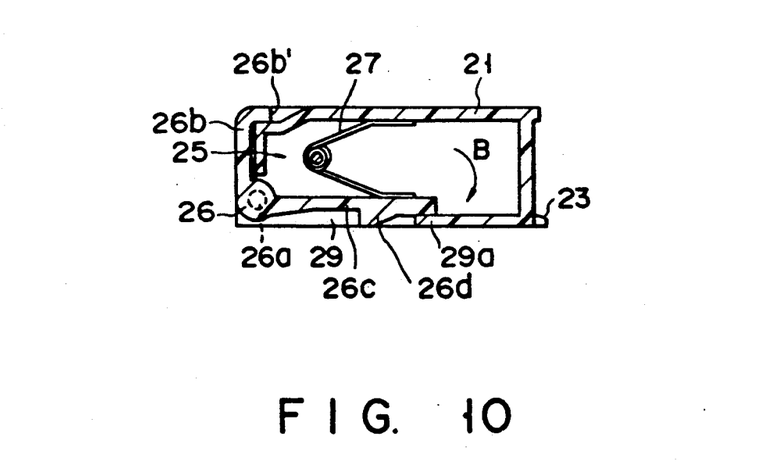
FIG. 10 is a sectional view taken along line X—X of FIG. 9.

The battery pack 21 has a fixing mechanism 25 in its central portion, whereby it is kept mounted in the power source receiving recess 11. As shown in FIGS. 9 and 10, the mechanism 25 includes a bell crank 26 rockably attached to the battery pack 21 and a torsion spring 27 for urging the crank 26.

The bell crank 26 is substantially L-shaped in lateral configuration, and its bent portion is supported on the battery pack 21 by means of a pivot 26a so that the crank 26 is rockable around the pivot. One arm portion of the crank 26 extends along that portion of the battery pack 21 which is exposed when the pack 21 is mounted in the recess 11, that is, from the rear face of the pack 21 to the rear end portion of the top face thereof, thus constituting an operating section 26b. As shown in FIG. 2, the operating section 26b is substantially T-shaped as viewed from the back of the battery pack 21, and has skid-proof corrugations on the outer surface thereof. A hollow 21a (see FIG. 12) is formed covering the rear face and the rear end portion of the top face of the battery pack 21. Normally, the operating section 26b engages the hollow 21a so as to be flush with the outer surface of the rear portion of the pack 21. As shown in FIG. 10, a distal end face 26b' of the operating section 26b is exposed so that a finger can be easily caught thereby.

The other arm portion of the bell crank 26 extends substantially at right angles to the operating section 26b and substantially parallel to the bottom surface of the battery pack 21, from the bent portion, thus constituting a retaining arm section 26c. A retaining pawl 26d protrudes integrally from the lower surface of the arm section 26c. It can engage the detent projection 5 in the power source receiving recess 1. The bottom wall of the battery pack 21 is formed with an elongate open portion 29 which extends forward from the rear end of the bottom wall. The whole arm section 26c except its extending end portion is exposed to the outside through the open portion 29. The extending end of the arm section 26c can engage an edge portion 29a of the bottom wall of the battery pack 21 which defines the front edge of the open portion 29.

The torsion spring 27 is disposed inside the battery pack 21. One arm portion of the spring 27 abuts against the ceiling surface of the pack 21, while the other arm portion of the spring abuts against the upper surface of the retaining arm section 26c, thereby urging the bell crank 26 to rock in the direction of arrow B around the pivot 26a. Meanwhile, the extending end portion of the arm section 26c is pressed against the edge portion 29a of the battery pack 21, whereby the crank 26 is restrained from rocking in the direction of arrow B. Thus, the bell crank 26 is normally kept in the state shown in FIG. 10.

As shown in FIG. 8, moreover, a pair of openings 24a are formed in the front end wall of the battery pack 21, and part of the each terminal strip 24 is exposed through its corresponding opening 24a. Thus, the battery pack 21 can be applied to a case where the terminal fitments are provided on that wall portion of the housing 1 which defines the front face of the power source receiving recess 11.

In mounting the battery pack 21 in the power source receiving recess 11 of the housing 1, the operator seizes the pack 21 with his or her fingers on the top and rear faces of the pack, and then insert it in the direction of arrow A of FIG. 8 from the back of the housing 1.

Thereupon, the retaining projections 23 are caused to engage the retaining surfaces (upper side edges) 9a of their corresponding peripheral retaining portions 9, while the retaining projections 22 are caused to engage the retaining surfaces 19a of their corresponding peripheral retaining portions 19. At the same time, the terminal fitments 7 come elastically into contact with their corresponding terminal strips 24 of the battery pack 21. Accordingly, the pack 21 is urged upward by the fitments 7. Thus, the battery pack 21 is fitted in the power source receiving recess 11 in a manner such that it is restrained from moving from side to side by the wall portions 13 and 17, and from moving upward by the aforesaid engaging structures.

Figure 11:
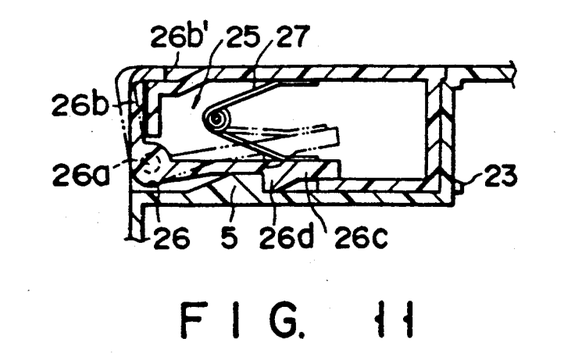
FIG. 11 is a sectional view showing a state in which the battery pack is fitted in a receiving recess of a housing.
Figure 12:
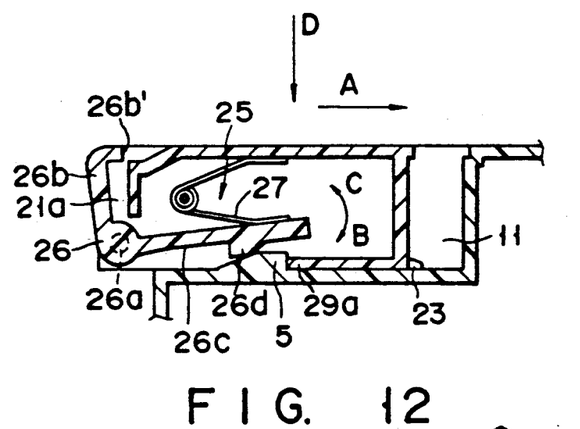
FIG. 12 is a sectional view showing a state in which the battery pack is in process of being fitted in the receiving recess of the housing.

The moment the battery pack 21 is mounted in this manner, the fixing mechanism 25 operates as follows. When the pack 21 is pushed in the direction of arrow A in a manner such that its under surface is in alignment with the bottom surface of the receiving recess 11, as shown in FIG. 12, the detent projection 5 of the recess 11 projects through the open portion 29 of the pack 21 into the pack. Accordingly, the retaining pawl 26d of the retaining arm section 26c runs onto the projection 5 of the recess 11, so that the bell crank 26 rocks in the direction of arrow C against the urging force of the spring 27. When the battery pack 21 is fully inserted into the receiving recess 11, thereafter, the retaining pawl 26d gets over the detent projection 5. Immediately after this, the crank 26 is rocked in the direction of arrow B by the urging force of the spring 27, so that the pawl 26d is caught by the projection, as indicated by full line in FIG. 11. Thus, the battery pack 21 is fixed in the receiving recess 11, and is prevented from slipping out rearward from the recess 11. This operation of the fixing mechanism 25 can be automatically achieved by only pushing the battery pack 21 into the receiving recess 11, in the direction of arrow A.

The mounting of the battery pack 21 can be completed by the aforementioned one-touch operation, so that the pack 21 can be stably set in the housing 1.

Alternatively, the battery pack 21 may be fitted in the power source receiving recess 11 through one-touch operation such that it is forwardly inserted from the rear side, as indicated by arrow A of FIG. 12, after being fitted into the recess 11 from above, as indicated by arrow D.

The battery pack 21 can be removed from the power source receiving recess 11 by reversely following the aforementioned processes of mounting operation. First, the operator draws out the whole pack 21 rearward while pushing the operating section 26b rearward with the thumb of his or her hand so that the hand is on the top and rear faces of the pack 21, which are exposed on the top face of the rear portion and the rear face, respectively, of the housing 1. Thereupon, the bell crank 26 is rocked counterclockwise, as indicated by two-dot and dash line in FIG. 11, by the action of the operating section 26b, resisting the urging force of the spring 27. As a result, the retaining pawl 26d of the retaining arm section 26c is disengaged from the detent projection 5, so that the battery pack 21 is released from the fixation by the fixing mechanism 25. The moment the pack 21 is released in this manner, the whole pack is removed from the power source receiving recess 11 by the aforesaid draw-out operation.

In drawing out the battery pack 21 from the receiving recess 11, the edge portion 29a of the bottom wall is caught by the detent projection 5, as shown in FIG. 12, so that the draw-out operation is temporarily stopped. In this state, the retaining projections 22 and 23 are not in engagement with their corresponding retaining portions 9 and 19. If the operator mistakenly releases his or her hold of the battery pack 21 in the disengaged state, therefore, the pack 21 can be prevented from unexpectedly falling, since the edge portion 29a is caught by the projection 5.

As shown in FIG. 8, a through hole 31 for wiring and a retaining hole 32 continuous therewith are formed at the corner between a front end wall and a bottom wall of the optional part receiving recess 15, on the side of the wall portion 17 which divides the recess 15 and the power source receiving recess 11. Further, a retaining hole 33 is formed at the same corner portion, on the side opposite to the recess 11. Also, a retaining groove 34 extending parallel to the wall portion 17 is formed on the side edge of the bottom wall of the recess 15, on the side opposite to the recess 11. A nut 35 is embedded in that end portion of the rear face of the housing 1 on the side opposite to the recess 11 so that it adjoins the recess 15.

The receiving recess 15 is fitted with a circuit board (not shown) for connection. If necessary, moreover, the recess 15 can contain an optional component, such as an interface substrate (not shown) for communication. An optional cover 36 is removably attached to the recess 15.

Figure 13:
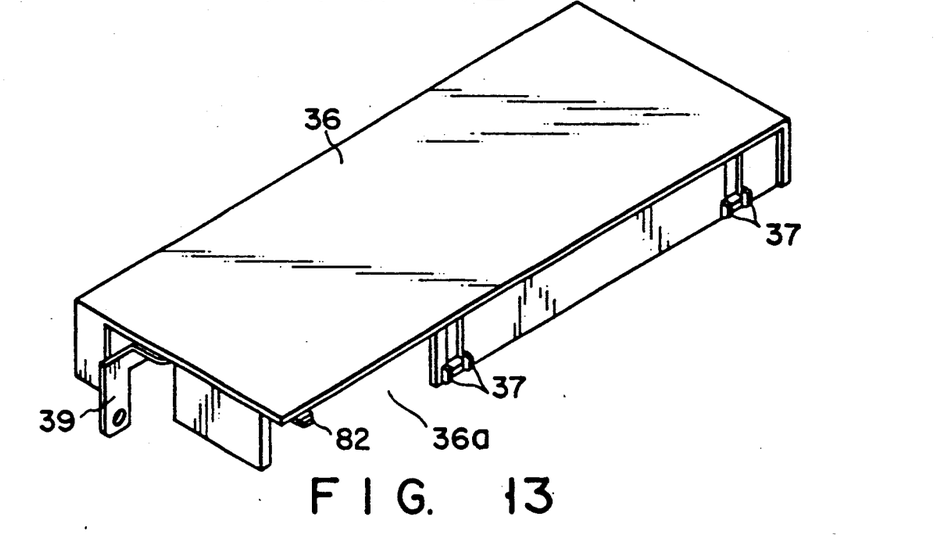
FIG. 13 is a perspective view of an optional cover.

As shown in FIGS. 8 and 13, the optional cover 36 includes a top wall having a rectangular plane configuration and a peripheral wall formed along the peripheral edge of the top wall. The width of the top wall is equal to that of the battery pack 21. A pair of retaining projections 37, which can be releasably fitted in the retaining holes 32 and 33 of the receiving recess 15, respectively, protrude integrally from the front wall of the optional cover 36. Also, the front wall of the cover 36 has a notch 36a which corresponds to the through hole 31. A rib (not shown), which is adapted to engage the retaining groove 34, protrudes from the lower end of the side wall surface of the cover 36, on the side opposite to the power source receiving recess 11.

In FIGS. 8 and 13, the reference numeral 80 denotes a knockout portion formed in the rear wall of the optional cover 36, and the reference numeral 41 denotes an engaging projection which project from the housing 1 into the receiving recess 15 and engages the lower surface of the front edge of the cover 36 as the cover is mounted. The reference numeral 82 denotes an engaging projection which protrudes from the rear edge of the top wall of the cover 36 and engages the edge of the through hole 31 on the housing side.

The optional cover 36 is fitted into the optional part receiving recess 15 from the back of the housing 1 in the direction of arrow E of FIG. 8. Thereupon, the retaining projections 37 are caused to engage their corresponding retaining holes 32 and 33, and the rib is caused to engage the retaining groove 34. Thus, the optional cover 36 is fitted to the receiving recess 15 in a manner such that it is restrained from moving from side to side by the wall portion 17 and the engagement between the rib and the groove 34, and from moving upward by the engagement between the projections 37 and the holes 32 and 33. The cover 36 is fixed to the housing 1 by means of a screw 38 and another screw (not shown) so as to cover the recess 15. The screw 38 is passed through the rear wall of the cover 36 to be threadedly engaged with the nut 35. The other screw is passed through a metal fitting 39 (see FIGS. 8 and 13) fixed to the cover 36, and is threadedly engaged with the circuit board for connection.

Figure 4:
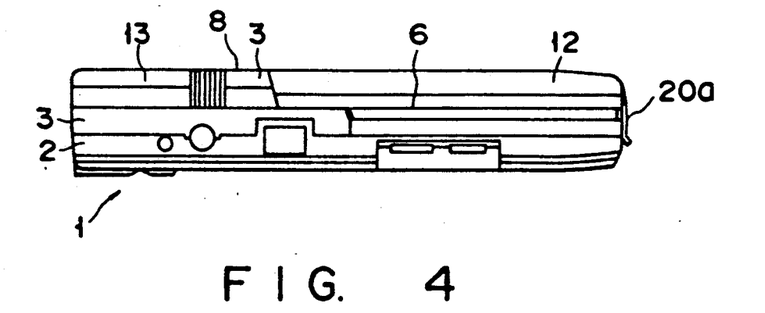
FIG. 4 is a side view of the computer.

In this mounted state, the top and rear faces of the optional cover 36 and the lateral face thereof opposite to the battery pack 21 are exposed, as shown in FIGS. 2 to 4, thus constituting part of the outer surface of the rear portion of the housing 1. In the present embodiment, the top and rear face of the cover 36 are arranged flush with the rear half portion 8 of the top face of the housing 1 and the rear face thereof, respectively. The top face of the optional cover 36 is also flush with the top face of the display unit 12 in the closed state. The upper end of the wall portion 17 is covered by those end portions of the pack 21 and the cover 36 which abut against each other.

The optional cover 36 can be removed, as required, from the housing 1 by reversely following the aforementioned processes of mounting operation.

As shown in FIGS. 14 to 19, a tilting mechanism 50 is attached to the central portion of the bottom of the rear end portion of the housing 1.

Figures 16, 17:
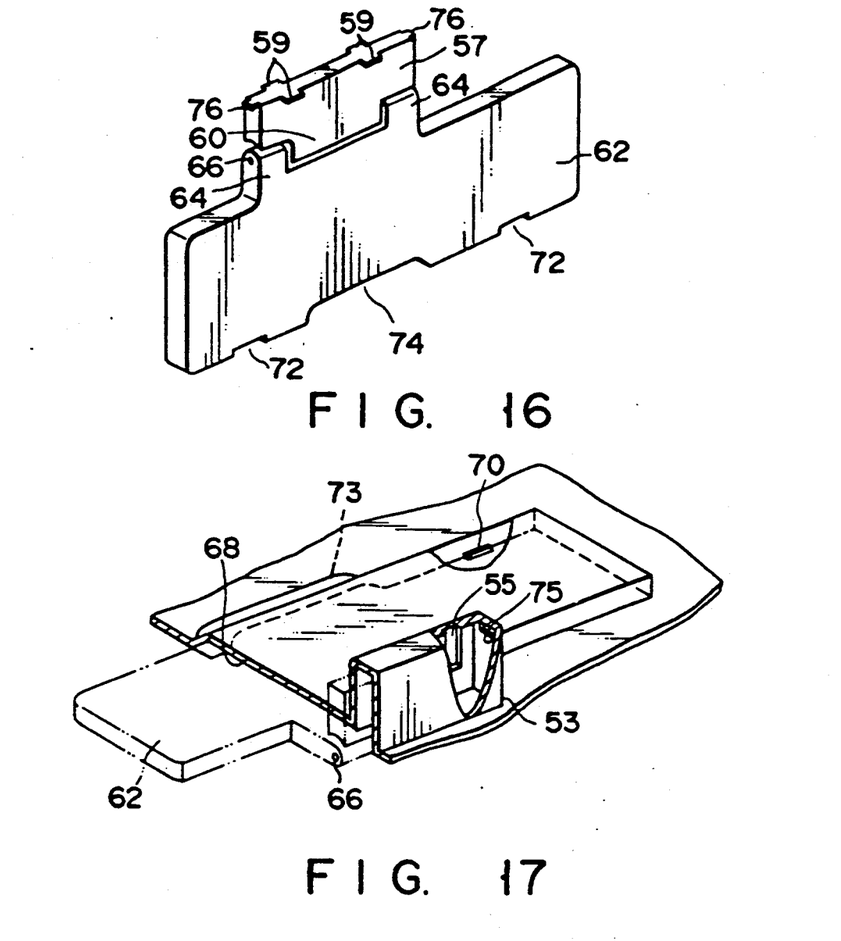
FIG. 16 is a perspective view showing the stand and a slider.
FIG. 17 is a sectional view schematically showing a stand holder portion.
Figure 18:
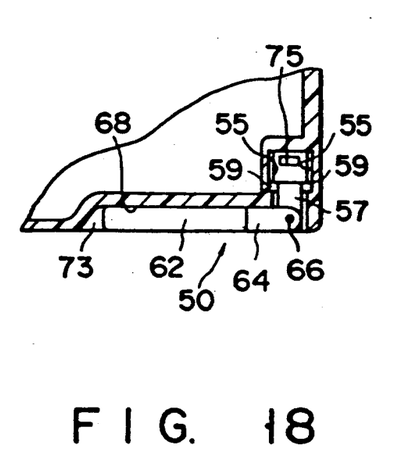
FIG. 18 is a sectional view of a tilting mechanism with the stand in the housed position.
Figure 19:
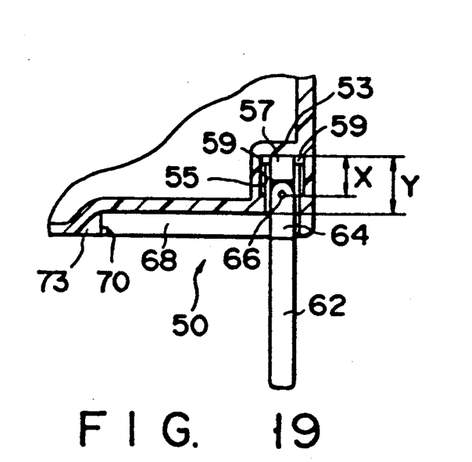
FIG. 19 is a sectional view of the tilting mechanism with the stand in the raised position.

As shown in detail in FIGS. 17 to 19, the tilting mechanism 50 is provided with a holder portion 53 in the form of a thin box in the center of the tail end portion of the housing 1. The portion 53, which has a rectangular cross section elongated in the transverse direction of the housing 1, extends upward from the bottom side of the housing. Only the lower end of the holder portion 53 opens to the bottom face of the housing 1. A slide passage (mentioned later) is defined by the inner surfaces of the holder portion 53. Two guide grooves 55 are formed on each of paired inner surfaces of the portion 53 which extend in the transverse direction of the housing 1. More specifically, each groove 55 vertically extends from the uppermost portion of its corresponding inner surface of the holder portion 53 to the middle portion thereof.

As shown in FIGS. 16 to 19, a slider 57 in the form of a rectangular prism, for use as a stand supporting member, is fitted in the holder portion 53 for vertical sliding motion. Namely, the slider 57 is formed of a plate member having a thickness corresponding to the cross section of the holder portion 53. Projections 59 are formed at the upper end of each lateral face of the slider 57 which faces the guide grooves 55. The projections 59 are adapted to be slidably fitted in their corresponding guide grooves. Thus, the slider 57 can slide in the holder portion 53 or the slide passage, within the range of extension of the guide grooves 55. A boss portion 60 for connection protrudes downward from the center of the lower end of the slider 57 on the bottom side of the housing 1.

The tilting mechanism 50 includes a stand 62 which is connected to the slider 57. As shown in FIG. 16, the stand 62 is formed of a rectangular plate as thick as or thinner than the slider 57. A pair of boss portions 64 for connection protrude from the center of one side end of the stand 62 so as to be spaced at a predetermined distance and situated on either side of the boss portion 60 of the slider 57. The boss portions 64 are rotatably connected to the boss portion 60 of the slider 57 by means of a shaft 66, which penetrates these boss portions in the transverse direction of the housing 1. Thus, the stand 62 can be rocked in the longitudinal direction of the housing 1, between a housed position shown in FIGS. 14 and 18 and a raised position shown in FIGS. 15 and 19.

A depression 68 for receiving the stand 62 is formed in the bottom face of the housing 1 so as to be situated in front of the holder portion 53. The depression 68 is shaped corresponding to the outer configuration of the stand 62. A bottom opening of the holder portion 53 communicates with the depression 68. Thus, the whole stand 68, including the boss portions 64, can be housed in the depression 68 by being brought down forward around the shaft 66. The depth of the depression 68 is equal to the thickness of the stand 62, so that the bottom face of the housing 1 is flush with the lower surface of the stand 62 when the stand is housed in the depression 68.

As shown in FIGS. 17 and 19, a pair of elastic hooks 70 protrude from the front-side edge of the depression 68. Corresponding to the hooks 70, a pair of engaging recesses 72 are formed at the end portion of the stand 62 on the side opposite to the slider 57. As the hooks 70 are removably engaged with the recesses 72, the stand 62 is prevented from unexpectedly getting out of the depression 68. A hollow 73 for finger access is formed on the front-side edge of the depression 68. Likewise, a hollow 74 for finger access is formed on the outer peripheral portion of the reverse side of the stand 62 which corresponds to the hollow 73. Thus, the stand 62 in the housed state can be raised with ease.

As shown in FIG. 19, the depth Y (distance from open end to bottom) of the holder portion 53 is greater than the distance X from the shaft 66 to the upper end of the slider 57. Thus, the stand 62 can be inserted into the holder portion 53 so that the upper end portions of the boss portions 64 and the shaft 66 are housed in the portion 53. In other words, the upper end portions of the boss portions 64 can be fitted into the holder portion 53 by inserting the stand 62 in the raised position into the portion 53. Thus, the upper end portions of the boss portions 64 are surrounded by the walls of the holder portion 53, so that the stand 62 is restrained from rocking and kept in the raised position. Projections 76 are formed on the top end face of the slider 57, and recesses 75 adapted to be releasably engaged with the projections 76 are formed on the upper end of their corresponding inner surfaces of the holder portion 53, whereby the raised stand 62 is positioned and fixed.

The length of the guide grooves 55 on the inner surfaces of the holder portion 53 is greater than the difference (Y-X) between the dimensions Y and X. By moving the raised stand 62 downward, along with the slider 57, so that the projections 59 of the slider 57 abut against the lower ends of the grooves 55, therefore, the boss portions 64 and the shaft 66 can be drawn out of the holder portion 53, so that the stand 62 can be rocked to the housed position.

Figure 14:
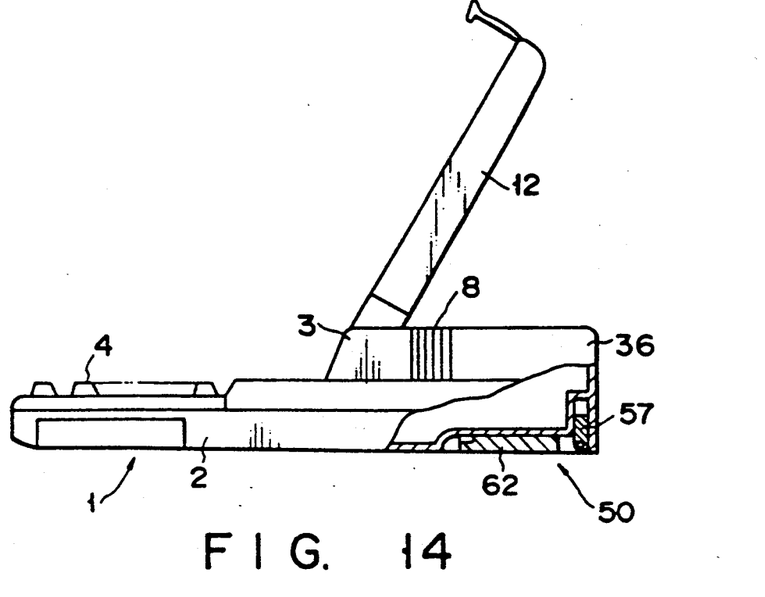
FIG. 14 is a side view of the computer with its stand in a housed position.

In carrying the personal computer with the tilting mechanism 50 described above, the display unit 12 is closed, and the stand 62 is brought down to the housed position where it is housed in the receiving depression 68, as shown in FIGS. 14 and 18. Thus, the housing 1, display unit 12, and stand 62 are combined into a single rectangular block which is handy to carry.

Figure 15:
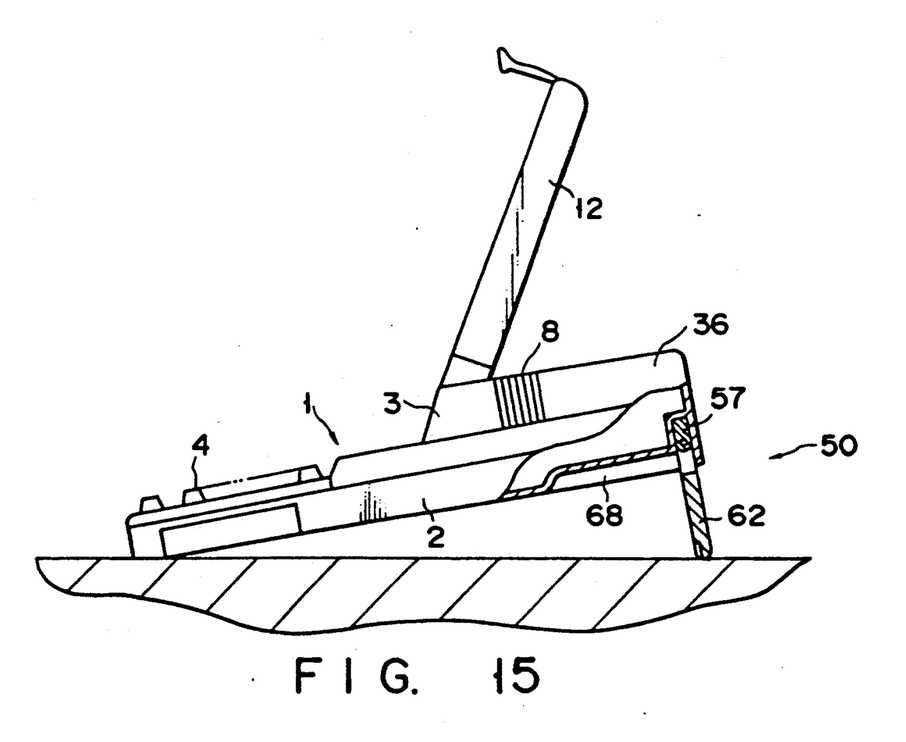
FIG. 15 is a side view of the computer with its stand in a raised position.

When using the personal computer on a desk or the like, the housing 1 is placed on the desk, and the display unit 12 is opened, as shown in FIG. 14. In tilting the keyboard 4 for use, the operator lifts the rear portion of the housing 1 in the state shown in FIG. 14 with one of his or her hands, and inserts a finger of the other hand into the hollow 73 at the bottom of the housing. Then, the operator draws out and raises the stand 62 from the depression 68 with the tip of the inserted finger caught by the hollow 74 of the stand. In this state, the stand 62 is rocked to the rear side until the boss portions 64 abut against the wall portion of the holder portion 53. Then, the stand 62 is urged to be pushed in toward the housing 1 so that the boss portions 64 are inserted into the holder portion 53. Thereupon, the boss portions 64, along with the slider 57, are fitted in the holder portion 53, as shown in FIGS. 15 and 19. As the boss portions 64 are thus located in the holder portion 53, the raised stand 62 is locked and prevented from falling in the longitudinal direction by the wall portion of the holder portion 53. Further, the projections 76 of the slider 57 engage their corresponding recesses 75 of the holder portion 53, whereupon the stand raising operation is completed.

When the housing 1 with the raised stand 62 is placed on desk or the like, as shown in FIG. 15, the keyboard 4 is declined forward, thus facilitating its operation.

Constructed in this manner, the personal computer of the present embodiment has the following advantages.

As mentioned before, the mounting portion for the battery pack 21 and the optional component is formed of the power source receiving recess 11 and the optional part receiving recess 15 which open to the top face of the rear portion of the housing 1, i.e., the rear half portion 8, and the rear face of the housing. The battery pack 21 and the optional cover 36 are fitted to the recesses 11 and 15, respectively. The top and rear faces of the pack 21 and the cover 36, mounted separately in the recesses 11 and 15 from behind the housing 1, are exposed on the rear half portion 8 of the top face of the housing and the rear face thereof, respectively, thus constituting part of the outer surface of the housing.

According to the arrangement described above, the housing 1 need not be provided with any partition wall portion for concealing the top of the space for housing the battery pack 21 and the optional component, so that the rear portion of the housing can be reduced in thickness.

The battery pack 21 and the optional cover 36 are mounted on the top side of the rear portion of the housing 1. In contrast with the case in which the battery pack and the optional cover are arranged in front of the keyboard 4, therefore, the keyboard cannot be crossed by any wires, and can be operated without hindrance. If the battery pack 21 and the like are attached to the flank of the housing 1, they overlap the keyboard 4, so that the thickness of the housing 1 increases. To avoid this, a space for storing the pack 21, etc. must be secured beside the keyboard 4, so that the transverse dimension of the housing 1 increases. According to the present embodiment, on the other hand, the battery pack 21 and the optional cover 36 can be attached to the housing 1 without arousing such a problem. Thus, the arrangement in which the pack 21 and the cover 36 are located at the rear portion of the housing 1 has a great advantage over other arrangements in being more effective in utilizing the space of the housing and for compact designing of the housing.

As mentioned before, moreover, the battery pack 21 can be mounted into or removed from the power source receiving recess 11 by moving the pack 21 in a direction perpendicular to its longitudinal direction. More specifically, the battery pack 21 is attached to the rear portion of the housing 1 so that its top and rear faces are exposed on the top face of the rear portion of the housing and the rear face thereof, respectively. Thus, the operator can remove the pack 21 rearward from the housing 1 after releasing it from the fixation by the fixing mechanism 25 with his or her hand on the top and rear faces of the pack 21. The direction of the release of the fixation by the fixing mechanism 25, that is, the rocking direction of the operating section 26b of the bell crank 26, is in alignment with the direction in which the battery pack 21 is drawn out from the receiving recess 11. Accordingly, these operations can be continuously performed one-handed, so that the battery pack 21 can be removed with ease. Also in mounting the battery pack 21 into the power source receiving recess 11, the operator can push in the pack 21 forward with his or her hand on the top and rear faces of the pack 21.

Since the operator can mount and remove the battery pack 21 with his or her hand on the exposed top and rear faces thereof, as described above, the operating efficiency can be improved.

During the process of removing the battery pack 21, moreover, the edge portion 29a of its bottom wall is caught by the detent projection 5 of the housing 1, whereby the movement of the pack 21 can be stopped temporarily. Thus, the battery pack 21 can be prevented from being mistakenly dropped while it is being drawn out rearward. After this temporary stop, the operator can reassure his or her hold of the battery pack 21, and then continue the removal thereof. After the edge portion 29a is caught by the detent projection 5, furthermore, the operator can take out the battery pack 21 from the receiving recess by lifting it diagonally upward. In this case, the stroke for the rearward draw-out of the battery pack can be shortened.

The personal computer is provided with the tilting mechanism 50, and the housing 1 can be easily tilted by only rocking the single stand 62 toward the rear side of the housing 1. In the raised position, moreover, the stand 62 is restrained from falling in the longitudinal direction by the wall portion of the holder portion 53, thus ensuring high stability. Since the space to house the stand 62 extends in the direction of the thickness of the housing 1, moreover, the tilting mechanism 50 does not constitute a hindrance to compact designing of the housing 1.

It is to be understood that the present invention is not limited to the embodiment described above, and that various changes and modifications may be effected therein by one skilled in the art without departing from the scope or spirit of the invention.

Naturally, for example, the battery pack 21 and the optional cover 36 may be mounted using various other arrangements without being limited to the above embodiment. Further, the power source receiving recess and the optional part receiving recess may be formed opening to the rear half portion of the top face of the housing and the rear portion of the lateral face thereof.

A plurality of detent projections and a plurality of retaining pawls may be provided on the housing and in the fixing mechanism of the battery pack, respectively. In the embodiment described above, moreover, the stand of the tilting mechanism is designed so that it is raised toward the rear side of the housing. Alternatively, however, the stand may be arranged so that it can be rocked and raised from the housed position toward the front side of the housing. Further, the stand in the receiving depression is retained by means of the elastic hooks (latch type) in the foregoing embodiment. Alternatively, however, the stand may be held in position by means of a spring, for example.

Furthermore, the present invention is not limited to personal computers, and may be applied to various other miniature electronic apparatuses, such as word processors.

what is claimed is:

1. A compact apparatus comprising:
   a housing substantially in the form of a rectangular prism, having a bottom face constituting a mounting surface and a top face opposed to the bottom face;
   information input means on the top face of the housing; and
   tilting means at the rear portion of the housing for tilting the bottom face, said tilting means including:
   a guide passage formed in the housing, having an opening on the bottom face of the housing, and extending from the opening toward the top face of the housing;

a slider having a first connecting portion and arranged in the guide passage, movable along the extending direction of the guide passage, between an up position where the first connecting portion is situated inside the guide passage and a down position where the first connecting portion is situated outside the guide passage;

a plate-shaped stand having a second connecting portion pivotally connected to the first connecting portion and rockable around the second connecting portion, between a raised position where the stand extends along the extending direction of the guide passage and a housed position where the stand extends substantially parallel to the bottom face of the housing, when the slider is in the down position, said second connecting portion being adapted to be inserted into the guide passage, thereby keeping the stand in the raised position, when the slider is moved to the up position; and a receiving depression formed in the bottom face of the housing, communicating with the opening of the guide passage, and adapted to house the stand in the housed position.

2. An apparatus according to claim 1, wherein said tilting means includes stopper means for locking the slider to the up position.

3. An apparatus according to claim 1, wherein said tilting means includes retaining means for retaining the stand in the receiving depression.

4. An apparatus according to claim 3, wherein said retaining means includes an elastic projection, formed on the housing so as to project into the receiving depression, and a recess formed in the stand and adapted elastically to engage the elastic projection when the stand is rocked to the housed position.

5. An apparatus according to claim 1, wherein said receiving depression has substantially the same shape and size as the stand, and said tilting means includes a hollow portion in the bottom face of the housing so as to open thereon, communicating with the receiving depression, and permitting a finger to be inserted therein.

6. An apparatus according to claim 1, wherein the bottom face of the housing has a rear end portion and a front end portion, said guide passage opening to a region near the rear end of the bottom face, said stand being rockable from the raised position toward the front end of the bottom face, thereby reaching the housed position.

* * * * *